April 25, 1961 V. H. DUTCHIK 2,981,387
CLIP
Filed Aug. 18, 1958 2 Sheets-Sheet 1
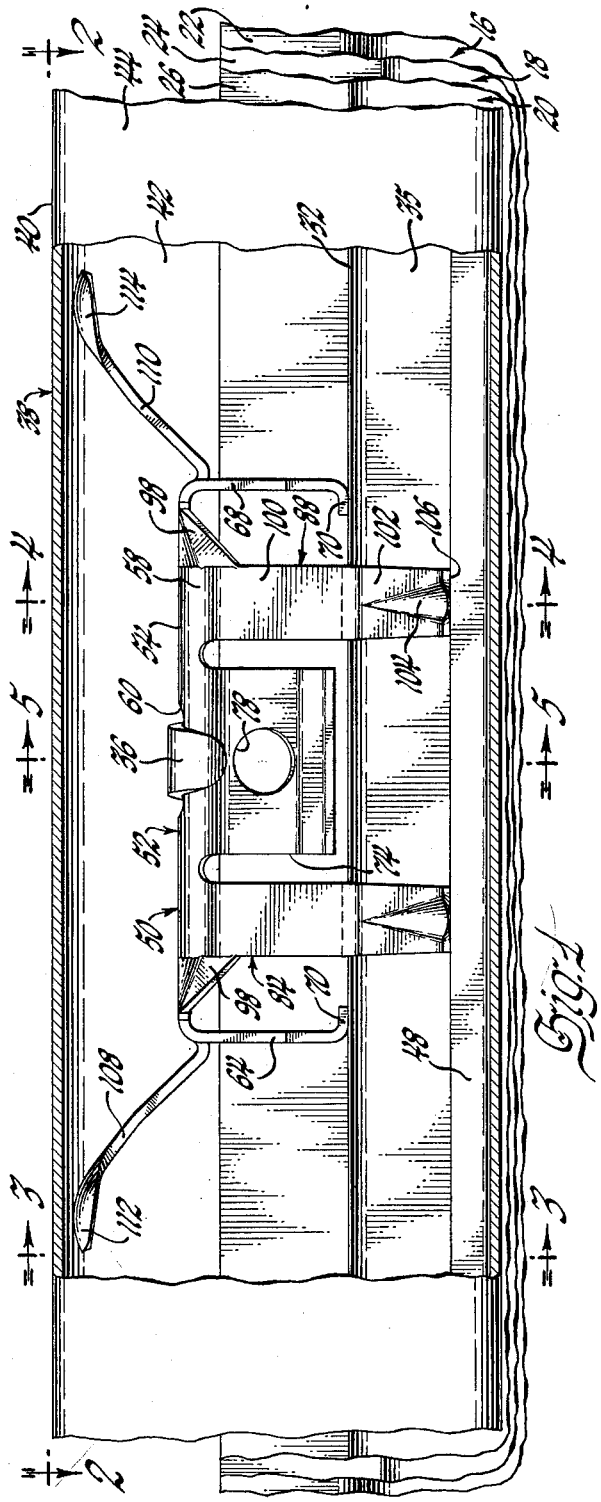
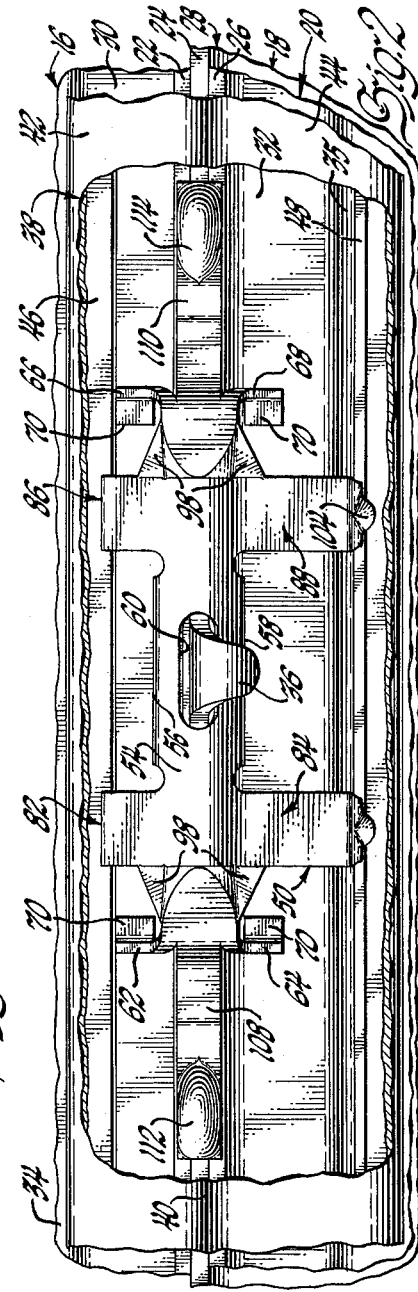
INVENTOR.
Victor H. Dutchik
BY
D. D. McGraw
ATTORNEY April 25, 1961 V. H. DUTCHIK 2,981,387
CLIP Filed Aug. 18, 1958 2 Sheets-Sheet 2

INVENTOR.
Victor H. Dutchik
BY
D. D. McGraw
ATTORNEY

United States Patent Office 2,981,387
Patented Apr. 25, 1961

2,981,387

CLIP

Victor H. Dutchik, Utica, Mich., assignor to General Motors Corporation, Detroit, Mich., a corporation of Delaware Filed Aug. 18, 1958, Ser. No. 755,587

2 Claims. (Cl. 189—88)

The invention relates to a clip for holding decorative and protective moldings in place and more particularly to a clip which may be fastened to a pinchweld joint over which the molding is to be secured. Such clips are particularly useful when the pinchweld joint is located at the edge of a body section having two or more panels secured together at the pinchweld and extending away from the pinchweld in close relation so that there is little space between the panels to permit the use of clips which extend through the panels. Since a pinchweld joint is desirable in this type construction, it is also desirable to cover the pinchweld in order to present a more attractive body exterior and to protect the joint from full exposure to the elements. The pinchweld is formed by joining two or more panels together by flanges on the panels which extend out of the panel planes and are substantially parallel. These flanges may be spot-welded together to provide the pinchweld joint.

When the molding is to be fastened to the pinchweld, it is desirable to provide a clip which is positively attached and will be mounted entirely within the confines of the molding. The clip should permit easy attachment of the molding and have good retention qualities. Such clips are particularly useful when the joint cannot be readily sealed from the interior of the compartment defined by the panels. It is difficult to obtain a positive seal when the panelled sections in the area of the pinchweld are very close together. By using clips embodying the invention, no clip attaching holes are required along the pinchweld area which extend through the panels and into the interior compartments. The clip may instead be fastened entirely on the exterior portion of the structure of which the panels are a part.

Clips embodying the invention may be springingly secured to the pinchweld by spring-like flanges which must be forced apart when installed over the pinchweld. These flanges may have one or more barbs provided which will firmly grip the pinchweld over which the clips are installed. The clips may also be permanently secured to the pinchweld by appropriate means such as a bent tab which may be formed from the portion of the pinchweld and passed through the clip before being bent. A third fastening means is also desirable in the event that such tabs are not positioned at a desired point, or are broken, malformed, etc. The clips embodying the invention therefore also include apertures permitting a separate fastener to be used to secure the clips to the pinchweld. The clip herein proposed is particularly useful in attaching moldings to vehicle bodies. While the clip illustrated in the drawings is shown as retaining a vertically extending molding to a pinchweld, it is also equally useful in retaining moldings which are oriented in other directions. Typical examples of such moldings include vehicle body side moldings and vehicle roof moldings.

In the drawings:

Figure 1 is an elevation view of a pinchweld and molding assembly using a clip embodying the invention and having parts broken away and in section.

Figure 2 is a view of the assembly taken in the direction of arrows 2—2 of Figure 1 and having parts broken away and in section.

Figure 3:
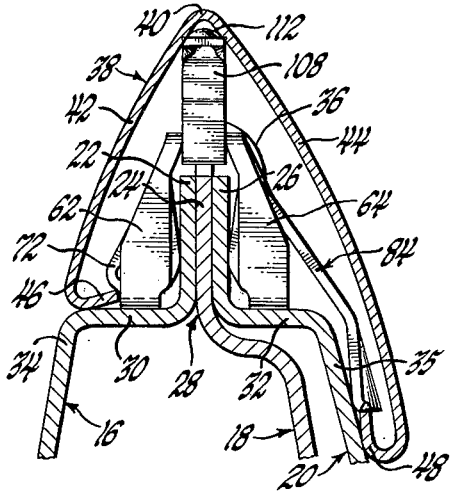
Figure 3 is a view of the assembly taken in the direction of arrows 3—3 of Figure 1 and having parts broken away and in section.

The assembly illustrated in the drawings includes panels 16, 18, and 20 which are provided with vertical flanges 22, 24, and 26. These flanges are in parallel relation when the panels are assembled to form a body and are joined together by any suitable means such as spot-welding to provide the pinchweld 28. Although the pinchweld is shown as being made of three such flanges which are formed from three panels, it may also be made of more or less flanges and panels. Each of the panels may be provided with a flat section adjacent the pinchweld. Panel 16 may be provided with flat section 30 and panel 20 may be provided with the flat section 32, with panel 18 being received intermediate panels 16 and 20. Panels 16 and 20 may also be provided with side sections 34 and 35 which extend away from the pinchweld 28 and form a relatively thin compartment immediately adjacent the pinchweld. Two such narrow compartments are formed when the third panel 18 is used. When panel construction of this nature is employed, it is extremely difficult to seal clip or fastener apertures formed in the panel sections 30 and 32 and it is therefore desirable to attach molding clips without requiring such apertures. Clips embodying the invention are particularly useful in construction of this nature.

One or more of the flanges, in this instance flange 24, may be provided with spaced upwardly extending tabs 36 which extend vertically upward to permit installation of the clips and are then bent over as illustrated after the clips embodying the invention have been properly positioned. One such tab is shown in the drawings.

The molding 38 may be placed over the pinchweld 28 in order to protect that joint as well as to make the final production more attractive. The molding is illustrated as being triangular in cross section and having the apex 40 positioned substantially in the plane of the pinchweld 28. The sides 42 and 44 of the molding extend downwardly and outwardly from the apex 40 and terminate in inwardly turned flanges 46 and 48, respectively. Flange 46 may be curved slightly upward so that the molding side 42 engages panel 16 at flat section 30 along a curved section of the molding. Inwardly turned flange 48 of molding side 44 may be reversely bent and extend upwardly toward molding apex 40 so that the molding side 44 may engage the outer surface of side 35 of panel 20. In order to permit engagement with the side of the panel, molding side 44 is of somewhat greater length than side 42. This construction permits a wider molding surface on one side of the pinchweld than that employed on the other side.

The clip 50 is positioned on pinchweld 28 so that it receives the pinchweld intermediate its sides and has portions engaging flanges 46 and 48 in order to hold the molding 38 in place. The clip is preferably formed with a centrally positioned and longitudinally extending body 52. This body may be formed in a generally channelshaped cross section and is illustrated in this instance as having a curved channel-like cross section defined by a center section or arched portion 54 and channel side sections 56 and 58. These sections are integrally formed to define the channel section of body 52.

The body center section 54 is undercut to provide an aperture 60 which receives one of the tabs 36 therethrough when the clip is placed over the pinchweld 28. Aperture 60 may extend a short distance into the side sections 56 and 58 if necessary in order to permit proper clip installation.

Each end of the clip is provided with a pair of terminal legs which engage the panels 16 and 20 at the flat portions 30 and 32 and support the clip relative to these panels. Terminal legs 62 and 64 are provided at one end of the clip and terminal legs 66 and 68 are provided at the other clip end. Each pair of legs is preferably coplanar and each of the legs forming a pair is spaced from each other so that a somewhat horseshoe-shaped end is provided when the clip is viewed from either end. This formation is clearly illustrated in Figures 3 and 6. The terminal legs are preferably generally parallel and integrally formed with the clip body 52. The planes of the pairs of legs may be substantially vertical and extend transversely of a vertically disposed longitudinal plane passing through the clip body. Each of the terminal legs may have a tab 70 formed on the outer end thereof which extends in a plane generally parallel to the longitudinal axis of the clip body 52. These tabs may extend either inwardly toward the clip center as illustrated or may extend outwardly if desired.

Figure 5:
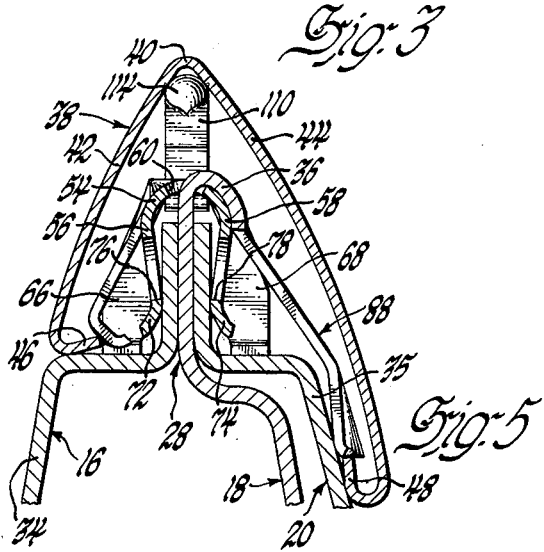
Figure 5 is a view of the assembly taken in the direction of arrows 5—5 of Figure 1 and having parts broken away and in section.
Figure 6:
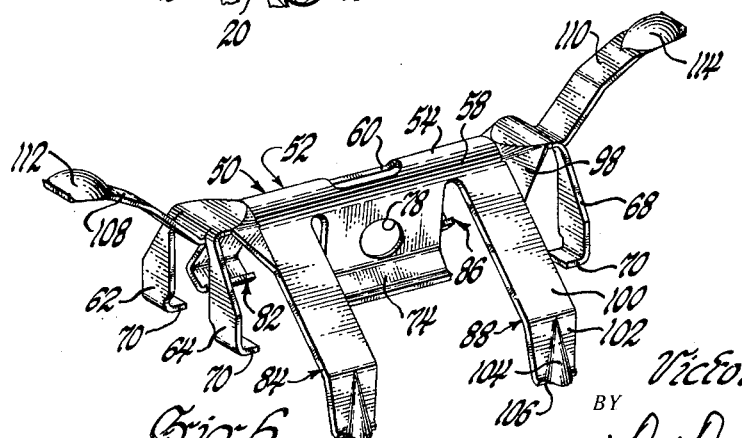
Figure 6 is an isometric view of the clip shown in the assembly of Figure 1.

A pair of flanges 72 and 74 may be integrally formed with the clip sides 56 and 58 and extend downwardly and inwardly toward the vertically disposed longitudinal center plane of the clip body and then be bent or curved to extend downwardly and outwardly from that plane. This construction is best illustrated in Figures 5 and 6. Flanges 72 and 74 are preferably positioned centrally of the clip. These flanges have apertures 76 and 78 provided respectively therethrough. Apertures 76 and 78 are substantially in alignment so that a suitable securing means such as a screw or bolt may be passed through the flanges 72 and 74 if desired. If the pinchweld tab 36 normally used to secure a clip to a pinchweld is at any time broken off or otherwise unuseable, a hole may be drilled through the pinchweld in alignment with aperture 76 and 78 and any suitable fastener such as a pin or bolt may be passed through the hole and the apertures to secure the clip in place on the pinchweld. This feature of the clip is particularly useful when the molding 38 is being replaced in service since the tab 36 may be broken during removal of the old molding strip and any clips requiring replacement. Flanges 72 and 74 may be provided with barbs struck from the portion of the flanges which engage the pinchweld in order to clip the pinchweld more firmly during the clip installation operation. The barbs are not necessary if the pinchweld 28 is of sufficient width to spread flanges 72 and 74 apart and thereby having a spring tensioning pressure exerted.

Figure 4:
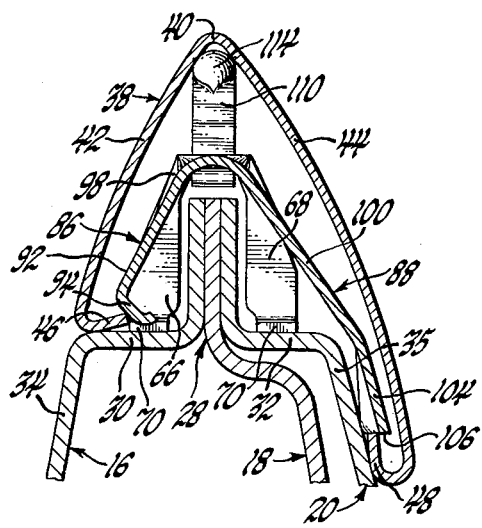
Figure 4 is a view of the assembly taken in the direction of arrows 4—4 of Figure 1 and having parts broken away and in section.

The clip body 52 is also provided with a pair of leg-like flanges 82 and 84 which are positioned between the terminal legs 62, 64 and the clip mounting flanges 72, 74. A similar pair of leg-like flanges 86 and 88 are positioned between terminal legs 66, 68 and mounting flanges 72, 74. Since flanges 82 and 86 are similar in construction, only flange 86 will be described in detail. This flange is integrally formed with the body side of 56 and extends outwardly and downwardly and then inwardly and downwardly a distance slightly less than that of the terminal legs in a vertical direction and slightly greater than that of the terminal legs in a horizontal direction. The construction of flange 86 is best seen in Figure 4. The flange is provided with a downwardly and outwardly extending section 92 and a downwardly and inwardly extending section 94 which terminates in a slightly curved end 96. The section 92 of the flange may be provided with a fillet on the side thereof adjacent the nearer pair of terminal legs. This fillet is integrally formed with flange 86 and the clip body section.

Flanges 84 and 88 are also similar and only flange 88 will be described in detail. This flange is provided with a downwardly and outwardly extending section 100 of somewhat greater length than section 92 of flange 86. It preferably extends to a point approximately even with the plane of flat section 32 of panel 20 when the clip is in the installed position. A fillet 98 may also be provided adjacent flanges 84 and 88. A second downwardly extending section 102 is bent so that it extends more nearly vertical than section 100 in order that it will approximately parallel the side 35 of panel 20. A section 104 is struck outwardly from end section 102 and a square end 106 is formed at the lower edge of that section. The struck portion 104 and the square end 106 provide a surface which more surely engages flange 48 of the molding 38. Thus when the molding 38 is installed over the clip, the molding flange 46 will be engaged by the outer surface of flange section 94 and the molding flange 48 will be engaged by the end 106 of flange 88. The molding will be tightly held against panels 16 and 20 by the spring action of flanges 84 and 86.

The clip body section 52 is also provided with an upwardly extending tab 108 at the end adjacent terminal legs 62 and 64 and an upwardly extending tab 110 adjacent terminal legs 66 and 68. These tabs extend outwardly from the clip body and are positioned generally in the vertical plane extending longitudinally of that body. The ends of tabs 108 and 110 are provided with curved engaging surfaces 112 and 114 respectively which are struck from the tab planes. Surfaces 112 and 114 extend into the inner side of the molding apex and further aid in positioning and retaining the molding 38 in place. They may act as springs which urge the molding 38 outwardly from the panels and effectively prevent any undue movement of the molding.

Due to the structural relationships of the clip mounting flanges 72, 74 and the molding retaining flanges 82, 84, 86, and 88, the clip may be placed over pinchwelds having various thicknesses which result in springing the flanges 72, 74 laterally outward without moving the molding retaining flanges. Similarly, moldings having various base widths may be accommodated without affecting the distance between the inner portions of the mounting flanges. The tabs 108 and 110 permit the installation of moldings having a relatively large height in comparison to their base width and permit moldings of various heights to be installed with the use of the same clips.

Assembly of the molding and clip on the pinchweld is accomplished by first pushing the clip 50 downwardly over pinchweld 28 so that a tab 36 extends through the clip aperture 60. The tab is then bent over the clip body 52 as illustrated in the drawings to hold the clip in place. After the desired number of clips have been installed on the pinchweld, the molding 38 is snapped in place over the pinchweld and in engagement with the clips to complete the assembly. Molding retaining flanges 82 and 86 are sufficiently spring-like in character to permit the molding to be first engaged with the squared ends 106 of flanges 84 and 88 and to then be snapped in place. The molding itself may be sufficiently flexible to permit its direct installation over the clips without having to first engage flanges 84 and 88. The molding strip is then anchored tightly in position and completely covers the pinchweld as well as the clip.

During service of any unit on which such moldings are installed, it is often necessary to replace a molding. In order to do so, the original molding may be easily snapped off the clip. Should any clips need replacements at this time, the tabs 36 holding such clips may be straightened and the old clips removed. The tabs are sometimes accidentally broken during this operation. The clips therefore are provided with apertures 76 and 78 which permit them to be secured to the pinchweld by separate fasteners. Although this method of attachment is considered to be primarily for use in service rather than for original installation, it may be used in the original assembly if desired.

What is claimed is:

1. In a clip for holding a flanged molding to a pinchweld, a clip body having a center section and two side sections integrally formed therewith and extending downwardly therefrom to provide a generally channel like cross section, said body center section having apertures formed therethrough for receiving a clip-holding tab formed on the pinchweld, a pair of generally parallel and coplanar clip-positioning terminal legs integrally formed on each end of said body and downwardly bent to extend transversely thereto and downwardly beyond said clip body, a first pair of flanges integrally formed with and positioned centrally of said body and extending first downwardly and inwardly toward the vertically disposed longitudinal center plane of said body and then extending downwardly and outwardly therefrom and having aligned apertures formed therethrough for receiving clip anchor means, a second pair of flanges integrally formed with one of said clip body side sections and positioned adjacent either end thereof, each flange of said second flanged pair extending first outwardly and downwardly and then inwardly and downwardly relative to said clip body a distance vertically less than the length of said terminal legs and a distance laterally greater than the overall width of said terminal legs, said second flange pair springingly engaging and holding one side of the flanged molding in position, and a third pair of flanges integrally formed with one of said clip body side sections and positioned centrally of said clip body and extending downwardly and outwardly relative to said body and having a molding flange engaging end formed thereon for engaging and springingly holding the flanged molding to the pinchweld, said third pair of flanges extending outwardly beyond and vertically below said terminal legs.

2. The clip of claim 1, said body having upwardly and longitudinally outwardly extending tabs formed thereon at opposite ends thereof substantially in the vertical longitudinal plane of said body for springingly engaging an inner surface of the flanged molding and urging the molding tightly against said second and third pair of flanges.

References Cited in the file of this patent
UNITED STATES PATENTS

| | | |
|---|---|---|
| 1,451,043 | Le Compte | Apr. 10, 1923 |
| 2,303,706 | Place | Dec. 1, 1942 |
| 2,350,315 | Kral | May 30, 1944 |
| 2,539,956 | Klingensmith | Jan. 30, 1951 |
| 2,685,473 | Adell | Aug. 3, 1954 |
| 2,746,111 | Chvosta | May 22, 1956 |
| 2,837,184 | Fernberg | June 3, 1958 |

FOREIGN PATENTS

| | | |
|---|---|---|
| 696,800 | Great Britain | Sept. 9, 1953 |